UNITED STATES PATENT OFFICE.

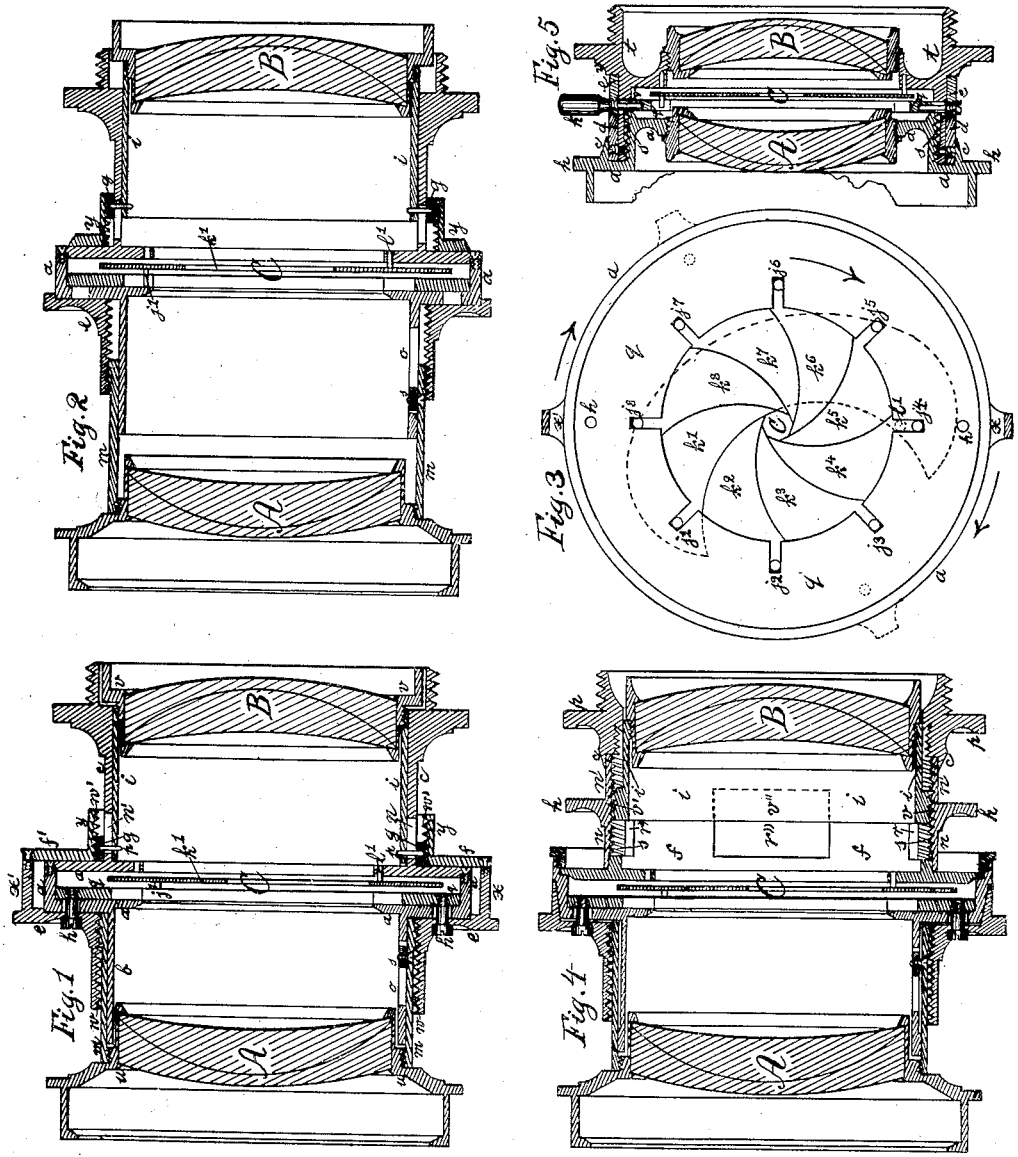

ERNST GUNDLACH, OF ROCHESTER, NEW YORK.

PHOTOGRAPHIC OBJECTIVE.

SPECIFICATION forming part of Letters Patent No. 461,609, dated October 20, 1891.

Application filed September 26, 1890. Serial No. 366,271. (No model.)

*To all whom it may concern:*

Be it known that I, ERNST GUNDLACH, of Germany, residing at Rochester, in the county of Monroe and State of New York, have invented a new and useful Improvement in Photographic Objectives; and I do hereby declare that the following is a full, clear, and exact description of the same.

My invention relates to such photographic objectives or lenses which are to be used with different openings or diaphragms, according to light, distance of object, angle of field, and other circumstances. Such objectives are most generally composed of two achromatic lenses, which are mounted rigidly onto the ends of a tube and in such a distance from each other as is most favorable to the special purpose of the objective, the diaphragm being situated about midway between the lenses. Such most favorable distance of the lenses, however, varies considerably with the diameter of the diaphragm used, and also with the angle of field to be embraced by the objective. For instance, in landscape-lenses, which require a wide angle of field and are mostly used with small diaphragms, the best photographic result is obtained with a comparatively short distance of the lenses from each other or from the diaphragm, while in portrait-lenses, which have a much smaller angle of field, but are generally required to work with comparatively wide openings or large diaphragms, the distance of the lenses is to be correspondingly great, in order to produce the least possible focal distortion at or near the edges of the picture. In fact, if the distance of the lenses is so regulated that the objective will with a small diaphragm produce the best possible picture, it will work very unsatisfactory with a large diaphragm, producing a curved field and much distortion at the sides. If, however, the lenses are brought farther apart to a certain point, so as to have the most favorable position for a large diaphragm, then the picture produced with such will certainly show considerable improvement, while on the other hand it would be much inferior if, at this position of the lenses, a small diaphragm were used. A similar relation exists between the angle of field and the distance of the lenses. The wider an angle the objective is to embrace the nearer the lenses must be brought together or to the diaphragm, not for the immediate purpose of producing such wide angle, but to compensate or balance the irregular aberrations in the flatness of the field, and thus to reduce these errors, which certainly increase with the angle, to a minimum. Thus a short distance of the lenses will adjust the objective for small diaphragm and wide angle and a long distance for large diaphragm and narrow angle at the same time. Furthermore, if the object is very near to the objective and the diaphragm of the latter is large—as is, for instance, generally the case with the portrait-objective—then the proper or most favorable distance of the lenses of the objective also varies considerably with the distance of the object, and still more with the difference of the distances of different parts of the object. If, for instance, a person is to be taken in a sitting position, the hands are usually much nearer to the objective than the face, and, consequently, if the image of the latter appears sharply defined on the focusing-screen the hands are out of focus, the latter being too long and lying behind the plane of the image. Provided, then, the image of the hands is near the edge and the face at or near the center of the picture, the defect could be remedied by bringing the lenses of the objective nearer together, in order to shorten the oblique focus or that which forms the image of the hands. Thus in this particular or exceptional case a shorter distance between the lenses than that most favorable for general purposes would be proper.

The object of my invention is to provide for suitable means of conveniently varying the distance of the lenses of the photographic objective from each other or from the diaphragm at will, so that the same may be expressly and accurately adjusted for any size of diaphragm, and also for any angle of field or size of picture, if required, or, as in the case of the portrait-objective, for any distance of object or difference of distances of different parts of the object. I accomplish this end in several ways, which I describe as follows:

The accompanying drawings illustrate my invention in the most accomplished form, showing my new adjustment as being immediately combined with a so-called "iris diaphragm," so as to act automatically in accordance with the diaphragm when the latter is operated.

Figures 1 and 2 are longitudinal sections of the objective, Fig. 1 showing the adjustment closed or the lenses at their nearest distance, Fig. 2 at their longest distance; and Fig. 3 is a front view of the iris diaphragm, showing the revolving plate and its connection with the blades. Fig. 4 is an objective having both an automatic adjustment for different apertures and a non-automatic or independent adjustment for different angles of field and different distances of object. Fig. 5 represents a wide-angle objective with non-automatic adjustment for both different angles of field and different diaphragms combined.

A, B, and C are the constituents of the objective, A being the front lens, B the back lens, and C the diaphragm of the same.

$a\ a$ is the case of the iris diaphragm, carrying at its sides the tubes $b$ and $c$, which are firmly secured to the same and inclosing the revolving plate $q$ and the blades, usually eight in number, of which only one $k$ is shown in the drawings. The blades are with one end hinged symmetrically around the center of the apparatus at $l$, and at the other end $j$ they are connected with the plate $q$ in such a manner as to form an approximately round opening, which is contracted by turning the plate one way or widened by turning the other way. The turning is effected from the outside by the corresponding turning of the ring $e$ with which the plate is connected by the pin $h$ in the usual manner. This concludes the necessary description of the well-known iris diaphragm and the other known or old parts of the apparatus, while in the following I describe only those parts which embody my invention.

The ring $e$ is united with the ring $y$ by means of the projections $x$ and $x'$, which are connected with the corresponding projections $f$ and $f'$ of the ring $y$. The rings are each provided with a female screw $w\ w'$, which actuate the corresponding male screws of the sliding tube $m$ and the ring $g$, respectively. One of the screws is right-handed, the other left-handed. The tube $m$ is loosely fitted on the fixed tube $b$, and is provided with a little block $s$, which slides in the rectilinear slot $o$. The tube $i$, which is loosely fitted inside of the tube $c$, is connected with the ring $g$ by means of the pins $p\ p'$, which slide in the respective rectilinear slots $n\ n'$ of the tube $c$. The lenses A and B are secured to the respective sliding tubes $m\ i$ by means of their cells $u\ v$.

When the ring $e$ is turned one way or the other, the opening of the iris diaphragm will in the well-known manner contract or widen, according to the direction of the turn, and at the same time the tubes $m$ and $i$ will slide in opposite directions, thus lengthening or shortening the distances of the lenses A and B from the diaphragm C, and, owing to the corresponding arrangement of the screws $w\ w'$, these motions will be in the required accordance to the changes of the diaphragm—viz: the lenses will move toward the diaphragm when the opening of the latter is diminishing and separate when the same is widening, while the threads of the screws are properly chosen to so regulate the rate of the motion that with any size of aperture of the diaphragm from the largest to the smallest the lenses will attain the proper positions for the best possible correction of the field. This will also be true with the angle of field, since not only the diaphragm is to be the smaller, but, for the best possible correction of the optical errors also, the distance of the lenses to be shorter the wider an angle of view the photographic picture to be taken with the objective is to represent. Thus no attention need be paid to the adjustment in operating this apparatus; but the simple regulation of the size of the diaphragm in the usual manner will suffice and automatically place the lenses in the proper position. In fact, whatever the outside conditions may be it is impossible to use this objective otherwise than at its best possible performance, provided the size of the diaphragm is properly adjusted and adapted to the case. It must, however, not be understood from the description of my automatic adjustment in combination with the iris diaphragm that I claim the iris diaphragm itself or any other similar device or any improvement thereof to form a part of my invention; but my improvement of the photographic objective consists merely in the special arrangement for varying and adjusting the distance of the lenses and in the combination of the same with the iris diaphragm in such a manner that the adjustment may act automatically when the diaphragm is operated in the usual manner. Also, my adjustment device or its purpose must not be confounded with any kind of focusing arrangement, as the focusing is certainly and apart and independently from my new adjustment required in the use of my objective, same as in ordinary objectives.

Although the iris diaphragm is probably the best adapted to act in combination with my automatic adjustment, I do not limit myself to this particular type; but any other mechanism in which the size of the diaphragm is regulated in a similar or suitable way may be employed for the purpose in place of the same. Nor do I limit myself to the special device of the adjustment itself, as described, since many changes in the same are admissible and may even offer advantages to some special requirements. Furthermore, my invention is by no means confined to the compound objective—that is, to such which consist of two lenses, one in front and the other back of the diaphragm, as described and illustrated in the drawings; but it may just as well, and with equal advantages, be applied to the single objective—that is, to such which consist of only one (achromatic or non-achromatic) lens and a diaphragm—since the altering or adjusting of the distance between the lens and the diaphragm of such objective has precisely the same beneficial effect as in the compound lens. Besides this, numerous suitable but non-automatic devices for effecting the required adjustment are possible and may be desirable in particular cases, a few of which I describe as follows:

First. I provide the objective with two or more interchangeable tubes of different lengths and arrange the same so as to carry or receive diaphragms of different sizes in the usual manner, or to carry one fixed diaphragm of the exact size, corresponding to the distance of the lenses to be secured by the respective tubes.

Second. I provide the diaphragm-tube with sliding tubes, which are to carry the lenses, similar to those illustrated in the drawings, but without the adjusting-screws $w\ w'$, so that the diaphragm and the lenses are to be adjusted separately.

Third. Instead of adjusting both lenses it will, under certain circumstances be sufficient and even more convenient to adjust the distance between the lenses by the movement of the front lens only. In this case I secure the back lens directly to the diaphragm-tube, as usual. This arrangement will also apply to the automatic adjustment described.

Fourth. In order to facilitate the finding of the proper position of the lens or lenses I provide the adjustment with index and graduation, indicating the exact position of the lens or lenses for any given size of diaphragm.

Fifth. In order to facilitate the moving of the sliding tube or tubes, I provide the same with rack-and-pinion or any suitable screw or lever arrangement to be operated by hand.

Any of the above-described devices may also be applied to the single objective, same as the automatic mechanism.

Fig. 4 of the accompanying drawings represents a compound objective which is adjustable for different angles of field or sizes of picture, and for different distances of object, as well as for different apertures of diaphragm, the latter adjustment being automatic, same as in Fig. 1, but moving only the front lens A, while the movement of the back lens B is not connected with the iris diaphragm C, and is to be operated independently from the same by hand. For this purpose the screw-ring $n\ n'$ is provided with a rim $h$, which is milled at its edge. The tube or ring $i$, to which the back lens B is attached, slides inside of the fixed tube $f$, and connects with the screw $s$ of the outer ring $n\ n'$ by a screw-threaded rim which is partly cut away so as to leave four equal sections $v\ v'\ v''$, (the latter being indicated by dotted lines, the fourth not being shown in the drawings,) which project through the corresponding slots $r\ r'\ r''$, cut in longitudinal direction into the fixed tube $f$. Thus the projecting sections $v\ v'\ v''$ will slide in their slots along the edges of the same and move the lens B in the direction of the optical axis of the apparatus when the outer ring $h$ is turned by hand one way or the other. The latter is at $n'$ provided with a graduation marked with the different sizes of picture to be made with the objective, and the overlapping edge $c$ of the fixed ring $p$ has an index to which the graduation is set. The same movement may also serve to adjust the objective for different distances of the object at the same time. For this purpose the fixed edge $c$, instead of having only an index, is to be provided with a full graduation, similar to that of the ring $n'$, but marked with figures indicating the different distances of the objects. To adjust them, the objective for a certain desired size of picture and for distance of object at the same time, the corresponding lines of both graduations bearing the respective markings are made to coincide by turning the rim $h$.

Fig. 5 is a wide-angle objective having a non-automatic adjustment for the correction of optical errors at different angles of field, as well as different sizes of diaphragm. Wide-angle objectives are usually working at an excessive angle, and, being rigidly mounted and properly adjusted in length for such angle, their use is practically limited to that only angle or one single size of picture, because for any other sizes the objective will be more or less out of its optical correction and produce inferior pictures. If, however, the objective is provided with an adjustment, as shown in Fig. 5, it can be properly corrected for and thus adapted to any smaller angle or size of picture, whereby its practical utility is greatly increased. The Fig. 5 is chosen to represent the case where only one lens A is made movable, while the other B is in a fixed position. The adjustment is operated by turning the hood $a$ by hand at its milled rim $h$. The hood carries the lens A, and is provided with a screw $s$, which screws into the front extension of the body $t$. The latter carries the back lens B and holds the same in a fixed position. Thus when the hood $a$ is turned one way or the other the screw $s$ will bring the lenses either nearer together or farther apart.

The iris diaphragm is operated by the turning of the handle $k$, which is tightly screwed into the revolving ring $e$ and extends inward through a slot $r$ cut in transversal direction into the body $t$, whence it reaches and guides the inner revolving plate $q$ of the diaphragm, with which the blades are connected, same as in Fig. 1. The fixed ring $d$ serves as a shoulder against the revolving ring $e$, holding the same in its place. The projecting ring $c$ of the hood $a$ overlaps the fixed ring $d$, and both are provided with graduations, that of c being marked with the different sizes of picture to be made with the objective, while d shows the different diaphragms. For use, the hood a is then turned so that the line of c, marked with the size of picture to be made, coincides with the line of d, marked with the size of diaphragm to be used, when the distance of the lens A and B from each other will be just right for both the size of the picture and the diaphragm at the same time, same as in Fig. 4. The proper setting of the diaphragm itself is controlled by a similar graduation marked on the ring e and an index engraved on the body at v.

It must, however, not be inferred from the particular descriptions of the several devices which I have adopted in the practical embodiment of my invention that the latter is necessarily limited to such details; but, on the contrary, the principle of my invention may be utilized through the medium of very different mechanism, which, however, may be readily devised by any mechanic or optician since the principle of my invention has been communicated to the public.

What I claim as my invention, and desire to secure by Letters Patent, is—

1. In a photographic objective having an adjustable or iris diaphragm, the combination, with the revoluble or operating ring of said diaphragm, of a sliding tube carrying an objective-lens and being connected with said ring by means of an external and internal screw, substantially as described and shown.

2. In a photographic objective having an adjustable or iris diaphragm, the combination, with the revoluble or operating ring of said diaphragm, of a sliding tube carrying an objective-lens and an external and internal screw connecting the sliding tube with the revoluble ring of the diaphragm, for the purpose described.

3. In a photographic objective having an adjustable or iris diaphragm, the combination, with the revolving or operating ring of said diaphragm, of an internally-screw-threaded sleeve secured to said ring and a sliding tube carrying an objective-lens and having an external screw which fits within the threaded sleeve, substantially as and for the purpose described and shown.

4. In a photographic objective, the combination, with the fixed or body tube, of a revoluble or operating ring having an internal screw, and a longitudinally-sliding tube carrying an objective-lens, and having an external screw which fits within the internal screw of said operating-ring, for the purpose described.

ERNST GUNDLACH.

Witnesses:
  WM. JOHNSON,
  DERRICK W. ROSS.